United States Patent [19]

Paquin et al.

[11] Patent Number: 5,343,654
[45] Date of Patent: Sep. 6, 1994

[54] SUPPORTING, WATERING AND FERTILIZING STRUCTURE FOR PLANTS

[76] Inventors: Alexander Z. Paquin; Marjorie Paquin, both of 56 Statler Ave., Debary, Fla. 32713

[21] Appl. No.: 181,007

[22] Filed: Jan. 14, 1994

[51] Int. Cl.⁵ ............................................. A01G 29/00
[52] U.S. Cl. ........................................ 47/48.5; 47/45
[58] Field of Search ................... 47/48.5 G, 48.5 M, 47/45 R, 45 C

[56] References Cited

U.S. PATENT DOCUMENTS

| | | | |
|---|---|---|---|
| 2,850,992 | 9/1958 | Hooper et al. | 47/48.5 G |
| 2,902,953 | 9/1959 | Young | 47/48.5 G |
| 3,357,129 | 12/1967 | Torrence | 47/48.5 M |
| 4,603,506 | 8/1986 | Powell, Jr. | |
| 4,870,781 | 10/1989 | Jones | 47/48.5 M |
| 4,887,386 | 12/1989 | Minshull | |
| 4,922,653 | 5/1990 | Stone | |
| 4,995,190 | 2/1991 | Royer | |
| 5,142,818 | 9/1992 | Weigert | |

FOREIGN PATENT DOCUMENTS

| | | | |
|---|---|---|---|
| 384156 | 10/1923 | Fed. Rep. of Germany | 47/48.5 G |
| 8900235 | 8/1990 | Netherlands | 47/48.5 G |
| 18466 | 8/1912 | United Kingdom | 47/45 C |
| 2179834A | 3/1987 | United Kingdom | 47/48.5 G |

Primary Examiner—Thuy M. Bui
Assistant Examiner—Joanne C. Downs
Attorney, Agent, or Firm—Rhodes & Ascolillo

[57] ABSTRACT

A plant support device, for supporting and watering and fertilizing a plurality of plants, has an octagonal frame. The octagonal frame has eight hollow tubular segments. The eight hollow tubular segments are sequentially disposed end to end to form an octagonal conduit that has eight legs. Each one of the eight legs connect to, extend downward at a diagonal angle and extend away from one of the eight hollow tubular segments. Each of the eight legs include a hollow tubular leg member enclosing a leg channel communicating with the octagonal conduit. Each of the eight legs have at least one aperture disposed on a downward distal end communicating with the leg channel. There is a feeder conduit that communicates with the octagonal conduit. The feeder conduit has a feeder tube, a pressurized fluid fitting for connecting the feeder tube to a pressurized fluid source and a fertilizer introduction mechanism for introducing a fertilizer into the feeder tube.

12 Claims, 1 Drawing Sheet

U.S. Patent   Sep. 6, 1994   5,343,654
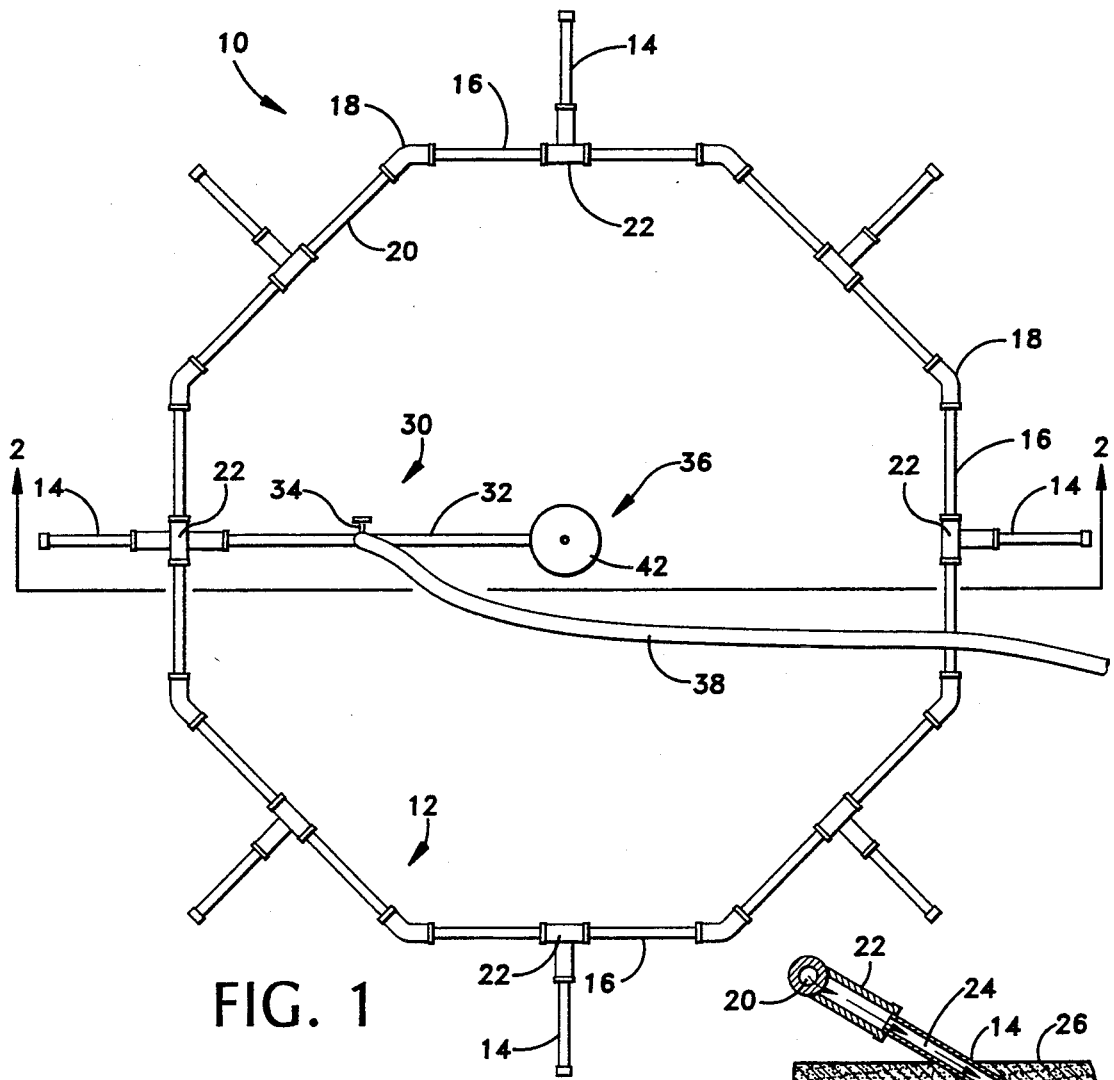
FIG. 1
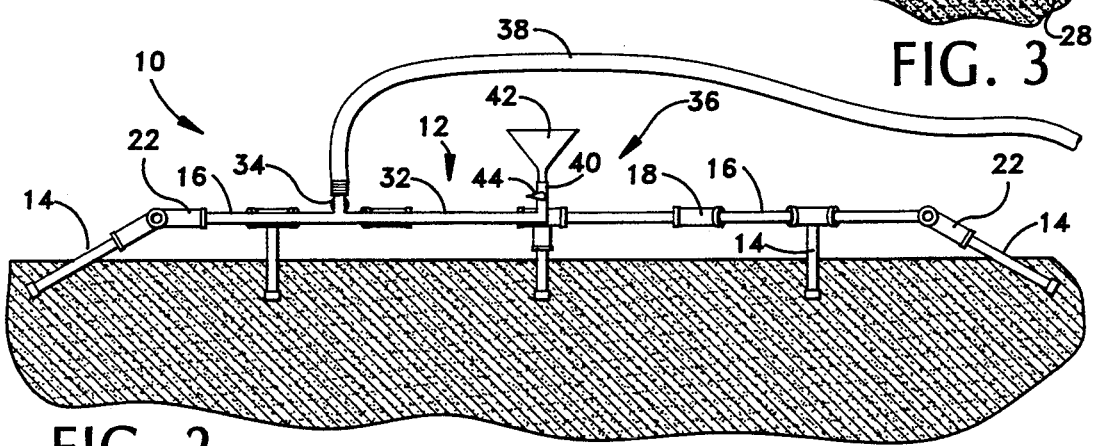
FIG. 3
FIG. 2

SUPPORTING, WATERING AND FERTILIZING STRUCTURE FOR PLANTS

BACKGROUND

1. Field of the Invention

The present invention relates to the field of agricultural supporting structures, most particularly structures that not only provide support for fruit bearing plants, but also provide a mechanism for watering and/or fertilizing the plants.

2. Description of the Related Art

U.S. Pat. No. 4,995,190 relates to an apparatus for introducing a fumigant into the soil that includes a horizontally branching tubular structure having dispersion holes that is disposed beneath the ground and into which a fumigant may be introduced under pressure.

U.S. Pat. No. 4,922,653 relates to a plant watering and feeding support system wherein hollow stakes are driven vertically into the ground at the four corners of a square, the stakes having a plurality of beneath ground openings. Horizontal tubular members connect the vertical stakes and make up a horizontal distribution network. Fluid may be poured into one of the hollow vertical stakes and thereby distributed to the four corners of the square.

U.S. Pat. No. 4,887,386 relates to an apparatus for transmitting fluids (e.g., to growing plants) that includes a pair of sheet members spaced apart from one another to define an interior space therebetween, and a manifold member for interconnecting with the interior space for fluid flow therebetween.

U.S. Pat. No. 4,603,506 relates to a hydroponic plant growing device that includes a tubular support frame for supporting plant growing trays and for providing a storage chamber for a fluid growing solution.

U.S. Pat. No. 5,142,818 relates to a plant feeding and shield apparatus that includes a torroidal ring structure positioned to surround a plant (e.g., a tree), the ring structure having a trough on its upper surface and fertilizer inserts about its periphery, whereby water (e.g., rainwater) is directed over the fertilizer and, through the bottom of the ring structure, to the area around the plant.

SUMMARY OF THE INVENTION

The yield of certain agricultural plants, most particularly vinous vegetable plants such a tomatoes, is heavily dependent upon the amount of water and fertilizing received by the plants. Additionally, the yield of market quality vegetables produced can be increased by proper supporting of the plants and also, in some cases, by judicious pruning, which is considerably easier to do if the plants are properly supported off of the ground. Still further, supporting vinous plants above the ground reduces blemishes and other marring of the fruits appearance and quality.

A number of structures have been proposed for supporting and watering plants. For example, U.S. Pat. No. 4,922,653, discussed above, discloses a structure that is rectangular or square, when viewed in plan, and in which the supported plants are watered by manually introducing a fluid into at least one of the four vertical uprights positioned at the four corners of the device. However, the rectangular configuration does not necessarily result in the most optimal plant spacing and placement, particularly for heavy feeding plants such as tomatoes. Additionally, with a large number of plants and/or supporting structures watering and/or fertilizing using the structure disclosed in this patent could become extremely arduous.

Accordingly, one object of the present invention is the provision of a plant supporting, watering, and fertilizing structure that provides for an improved plant placement, particularly for heavy feeding vinous plants such as tomatoes.

Another object of the invention is the provision of such a plant supporting, watering, and fertilizing structure that allows the watering and fertilizing of such heavy feeding plants to be accomplished with a minimum of effort.

Yet another object of the invention is the provision of such a plant supporting, watering, and fertilizing structure that is simple in construction and operation, and therefore inexpensive to manufacture.

In one aspect, the invention generally features a plant support device for supporting, watering, and fertilizing a plurality of plants, the plant support device including: an octagonal frame, the octagonal frame including eight hollow tubular segments, the eight hollow tubular segments being sequentially disposed end to end to form an octagonal conduit; a plurality of legs, one each of the plurality of legs extending downward from one of the eight hollow tubular segments; each of the plurality of legs including a hollow tubular leg member enclosing a leg channel communicating with the octagonal conduit, each of the plurality of legs having at least one aperture disposed on a downward distal end thereof communicating with the leg channel; a feeder conduit communicating with the octagonal conduit, the feeder conduit including: a feeder tube; a pressurized fluid fitting for connecting the feeder tube to a pressurized fluid source; and a fertilizer introduction mechanism for introducing a fertilizer into the feeder tube.

Preferably, each of the plurality of legs extends away from and downward at a diagonal angle to the one of the eight hollow tubular segments.

In another aspect, the invention generally features a plant support device for supporting, watering, and fertilizing a plurality of plants, the plant support device including: an octagonal frame, the octagonal frame including eight hollow tubular segments, the eight hollow tubular segments being sequentially disposed end to end to form an octagonal conduit; eight legs, one each of the eight legs being connected to and extending away from and downward at a diagonal angle to one each of the eight hollow tubular segments; each of the eight legs including a hollow tubular leg member enclosing a leg channel communicating with the octagonal conduit, each of the eight legs having at least one aperture disposed on a downward distal end thereof communicating with the leg channel; a feeder conduit communicating with the octagonal conduit, the feeder conduit including: a feeder tube; a pressurized fluid fitting for connecting the feeder tube to a pressurized fluid source; and a fertilizer introduction mechanism for introducing a fertilizer into the feeder tube.

Preferably, one each of the eight legs is connected to substantially the midpoint of one each of the eight hollow tubular segments; the fertilizer introduction mechanism includes a port provided in the feeder tube and a funnel insertable into the port provided in the feeder tube; and the feeder tube is disposed substantially horizontally, and the port provided in the feeder tube includes a first connector pipe connected to the feeder tube, the first connector pipe being disposed substantially vertically, and the funnel member being insertable into the first connector pipe.

In yet another aspect, the invention generally features a plant support device for supporting, watering, and fertilizing a plurality of plants, the plant support device including: an octagonal frame, the octagonal frame including eight hollow tubular segments, the eight hollow tubular segments being sequentially disposed end to end to form an octagonal conduit; eight legs, one each of the eight legs being connected to substantially the midpoint of one each of the eight hollow tubular segments and extending away from and downward at a diagonal angle to the connected hollow tubular segments; each of the eight legs including a hollow tubular leg member enclosing a leg channel communicating with the octagonal conduit, each of the eight legs having at least one aperture disposed on a downward distal end thereof communicating with the leg channel; a feeder conduit communicating with the octagonal conduit, the feeder conduit including: a feeder tube; the feeder tube connecting with the octagonal conduit and extending inward from the octagonal conduit to a point interior thereof; a pressurized fluid fitting for connecting the feeder tube to a pressurized fluid source; and a fertilizer introduction mechanism for introducing a fertilizer into the feeder tube; the fertilizer introduction mechanism including a port provided in the feeder tube and a funnel member insertable into the port provided in the feeder tube; the feeder tube being disposed substantially horizontally; the port in the feeder tube including a first connector pipe connected to the feeder tube, the first connector pipe being disposed substantially vertically; and the funnel member being insertable into the first connector pipe.

Preferably, the feeder tube is connected to substantially the midpoint of one of the eight hollow tubular segments, and the feeder tube extends to substantially the centerpoint of the octagonal conduit; the first connector pipe is disposed substantially at the centerpoint of the octagonal conduit; the pressurized fluid fitting is disposed between the octagonal conduit and the first connector pipe; the fertilizer introduction mechanism additionally includes a shut off valve mechanism provided on the first connector pipe for preventing the flow of fluid therethrough; and the octagonal frame additionally includes a plurality of 45 degree angle conduit sections, one of the plurality of 45 degree angle conduit sections interconnecting each of the sequentially disposed hollow tubular segments.

The invention will now be described by way of a particularly preferred embodiment, reference being made to the accompanying drawings, wherein:

BRIEF DESCRIPTION OF THE DRAWINGS

FIG. 1 is a top plan view of a plant supporting, watering, and fertilizing structure constructed according to the present invention;

FIG. 2 is a cross sectional elevational view of the plant supporting, watering, and fertilizing structure of FIG. 1, taken along the line I—I shown in FIG. 1; and FIG. 3 is a detailed elevational view of one of the leg members of the plant supporting, watering, and fertilizing structure.

DESCRIPTION OF THE PREFERRED EMBODIMENT

Referring initially now to FIGS. 1 and 2, a plant supporting, watering, and fertilizing structure 10 constructed according to the present invention generally includes an octagonal frame structure 12 having a plurality of legs 14 extending downward therefrom. Preferably, each of the plurality of legs 14 extends downward and diagonally away from the octagonal frame structure 12, as is most clearly seen in FIG. 2. The octagonal frame structure 12, in turn, is generally made up of eight hollow tubular segments 16 that are sequentially disposed end to end and are interconnected by 45 degree angle tubular sections 18 interposed therebetween. The hollow tubular segments 16 and the interposed 45 degree angle tubular sections therefore form an octagonal conduit 20 about which water, and optionally, fertilizer, can flow.

There are preferably eight legs 14, with one each of the eight legs 14 being preferably connected to substantially the midpoint of each of the eight hollow tubular segments 16 via a T-shaped connection 22. As shown most clearly in FIGS. 2 and 3, each of the preferably eight legs 14 encloses a leg channel 24 formed therewithin and connecting with the octagonal conduit 20, and each of the preferably eight legs 14 is adapted to penetrate beneath a ground level 26. Additionally, each of the distal ends of the legs 14 is provided with at least one aperture 28 that is disposed beneath the ground level 26 when the plant support device 10 is configured for use as shown in FIG. 2.

The plant support device 10 also includes a feeder conduit 30 that acts to supply water, and optionally, fertilizer, to the octagonal conduit 20, and from thence, to the ground via the leg channels 24 and the apertures 28. The feeder conduit 30 generally includes a feeder tube 32 that connects to the octagonal conduit 20, a pressurized fluid fitting 34 connecting the feeder tube 32 to a pressurized fluid source, and a fertilizer introduction mechanism 36 for introducing a fertilizer into the feeder tube 32. Preferably, the pressurized fluid fitting 34 is a threaded connection (including a shut off valve), of a type well known in the art, capable of connecting the feeder tube 32 to a conventional garden hose 38. The fertilizer introduction mechanism 36 is preferably in the form of a relatively short connector pipe 40 extending away from the feeder tube 32 and a funnel member 42 that can be inserted into the connector pipe 40 and removed therefrom. Preferably, the feeder tube 32 is oriented in a substantially horizontal position, and the connector pipe 40 extends substantially vertically upward therefrom. Most preferably, the feeder tube 32 extends inward from the octagonal conduit 20, with the fertilizer introduction mechanism 36 being positioned at substantially the centerpoint of the octagonal conduit 20 and the pressurized fluid fitting 34 being positioned between the octagonal conduit 20 and the fertilizer introduction mechanism 36.

The connector pipe 40 may be fitted with a shut off valve 44 so as to enable any possible flow of fluid from the connector pipe 40 to be prevented during introduction of water through the pressurized fluid fitting 34.

In use, the plant support structure 10 is placed in prepared ground (e.g., plowed, tilled, etc.), with the legs 14 penetrating beneath the ground surface 26. Preferably, a particularly heavy feeding plant (e.g., a tomato plant) is planted closely adjacent to each of the legs 14.

As the plants grow, they may be trained and/or trellised upright along the legs 14 and the octagonal frame structure 12, thereby simplifying pruning, weed control, etc. Watering adequate to ensure a good yield can be easily accomplished by via the pressurized fluid fitting 34, and fertilizer can be conveniently introduced via the fertilizer introduction mechanism 36, by inserting the funnel member 42 into the connector pipe 40 and introducing either a liquid or granular fertilizer thereinto. The introduced fertilizer can be readily delivered to the plants by closing the shut off valve 44 and subsequently watering the plants through the pressurized fluid fitting 34.

While the invention has been herein described by way of a particular preferred embodiment, various substitutions of equivalents may be effected without departing from the spirit and scope of the invention as set forth in the following claims.

What is claimed is:

1. A plant support device for supporting, watering, and fertilizing a plurality of plants, said plant support device comprising:
   an octagonal frame, said octagonal frame comprising eight hollow tubular segments, said eight hollow tubular segments being sequentially disposed end to end to form an octagonal conduit;
   a plurality of legs, one each of said plurality of legs extending downward from one of said eight hollow tubular segments;
   each of said plurality of legs comprising a hollow tubular leg member enclosing a leg channel communicating with said octagonal conduit, each of said plurality of legs having at least one aperture disposed on a downward distal end thereof communicating with said leg channel;
   a feeder conduit communicating with said octagonal conduit, said feeder conduit comprising:
      a feeder tube;
      a pressurized fluid fitting for connecting said feeder tube to a pressurized fluid source; and
      fertilizer introduction means for introducing a fertilizer into said feeder tube.

2. A plant support device according to claim 1, wherein each of said plurality of legs extends away from and downward at a diagonal angle to said one of said eight hollow tubular segments.

3. A plant support device for supporting, watering, and fertilizing a plurality of plants, said plant support device comprising:
   an octagonal frame, said octagonal frame comprising eight hollow tubular segments, said eight hollow tubular segments being sequentially disposed end to end to form an octagonal conduit;
   eight legs, one each of said eight legs being connected to and extending away from and downward at a diagonal angle to one each of said eight hollow tubular segments;
   each of said eight legs comprising a hollow tubular leg member enclosing a leg channel communicating with said octagonal conduit, each of said eight legs having at least one aperture disposed on a downward distal end thereof communicating with said leg channel;
   a feeder conduit communicating with said octagonal conduit, said feeder conduit comprising:
      a feeder tube;
      a pressurized fluid fitting for connecting said feeder tube to a pressurized fluid source; and
      fertilizer introduction means for introducing a fertilizer into said feeder tube.

4. A plant support device according to claim 3, wherein one each of said eight legs is connected to substantially the midpoint of one each of said eight hollow tubular segments.

5. A plant support device according to claim 4, wherein said fertilizer introduction means comprises a port provided in said feeder tube and a funnel member insertable into said port provided in said feeder tube.

6. A plant support device according to claim 5, wherein said feeder tube is disposed substantially horizontally, and wherein said port provided in said feeder tube comprises a first connector pipe connected to said feeder tube, said first connector pipe being disposed substantially vertically, and said funnel member being insertable into said first connector pipe.

7. A plant support device for supporting, watering, and fertilizing a plurality of plants, said plant support device comprising:
   an octagonal frame, said octagonal frame comprising eight hollow tubular segments, said eight hollow tubular segments being sequentially disposed end to end to form an octagonal conduit;
   eight legs, one each of said eight legs being connected to substantially the midpoint of one each of said eight hollow tubular segments and extending away from and downward at a diagonal angle to said sequentially disposed hollow tubular segments;
   each of said eight legs comprising a hollow tubular leg member enclosing a leg channel communicating with said octagonal conduit, each of said eight legs having at least one aperture disposed on a downward distal end thereof communicating with said leg channel;
   a feeder conduit communicating with said octagonal conduit, said feeder conduit comprising:
      a feeder tube;
      said feeder tube connecting with said octagonal conduit and extending inward from said octagonal conduit to a point interior thereof;
      a pressurized fluid fitting for connecting said feeder tube to a pressurized fluid source; and
      fertilizer introduction means for introducing a fertilizer into said feeder tube;
      said fertilizer introduction means comprising a port provided in said feeder tube and a funnel member insertable into said port provided in said feeder tube;
      said feeder tube being disposed substantially horizontally;
      said port in said feeder tube comprising a first connector pipe connected to said feeder tube, said first connector pipe being disposed substantially vertically; and
      said funnel member being insertable into said first connector pipe.

8. A plant support device according to claim 7, wherein said feeder tube is connected to substantially the midpoint of one of said eight hollow tubular segments, and wherein said feeder tube extends to substantially the centerpoint of said octagonal conduit.

9. A plant support device according to claim 8, wherein said first connector pipe is disposed substantially at said centerpoint of said octagonal conduit.

10. A plant support device according to claim 9, wherein said pressurized fluid fitting is disposed between said octagonal conduit and said first connector pipe.

11. A plant support device according to claim 10, wherein said fertilizer introduction means additionally comprises shut off valve means provided on said first connector pipe for preventing the flow of fluid therethrough.

12. A plant support device according to claim 11, wherein said octagonal frame additionally comprises a plurality of 45 degree angle conduit sections, one of said plurality of 45 degree angle conduit sections interconnecting each of said sequentially disposed hollow tubular segments.

* * * * *